May 25, 1926.

E. D. BOYCE

WOODWORKING MACHINE

Filed Oct. 13, 1923

1,586,063

4 Sheets-Sheet 1

Inventor

E. D. BOYCE

By Beale & Park

Attorney

May 25, 1926.

E. D. BOYCE

WOODWORKING MACHINE

Filed Oct. 13, 1923

1,586,063

4 Sheets-Sheet 2

Inventor
E. D. BOYCE
By Beale & Park
Attorney

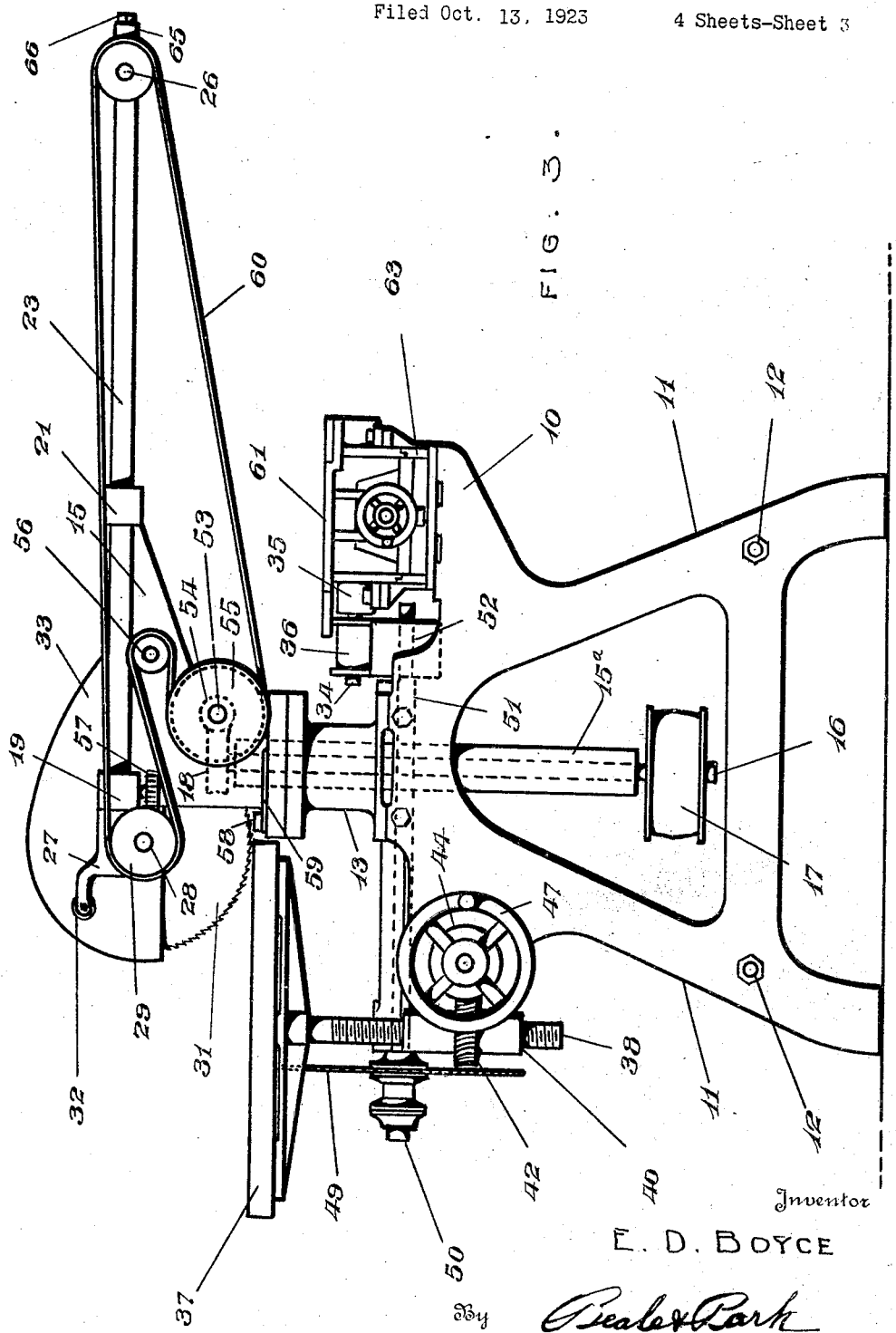

May 25, 1926.
E. D. BOYCE
1,586,063
WOODWORKING MACHINE
Filed Oct. 13, 1923      4 Sheets-Sheet 4
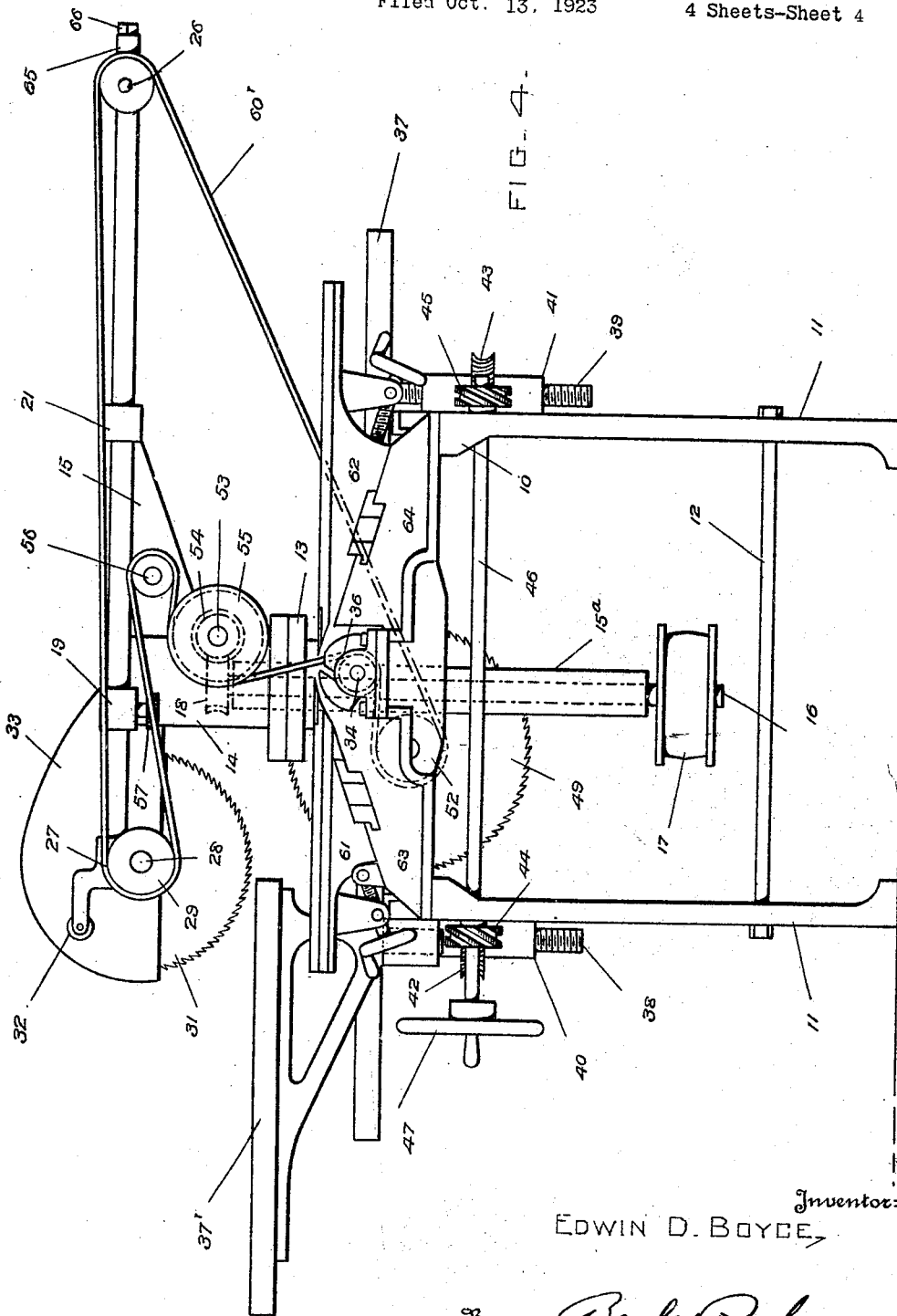
Inventor:
EDWIN D. BOYCE,
By Bealer Park
      Attorney Patented May 25, 1926.

1,586,063

UNITED STATES PATENT OFFICE.

EDWIN DOUGLAS BOYCE, OF NORRISTOWN, PENNSYLVANIA, ASSIGNOR TO HUTCHINSON MANUFACTURING CO., INCORPORATED, OF NORRISTOWN, PENNSYLVANIA, A CORPORATION OF PENNSYLVANIA.

WOODWORKING MACHINE.

Application filed October 13, 1923. Serial No. 668,271.

This invention relates to improvements in woodworking machines, and has special reference to a machine more particularly adapted to be operated by a gas engine.

An object of this invention is the combination with a main frame a conventional adjustable table, a rip-saw shaft, a planer shaft, a sliding carriage having a cross-cut shaft and a vertical shaft adapted to receive power from outside and transmit same by means of gears, pulleys and belt to the above mentioned shafts as and for the purpose to be set forth.

A novel feature of my device is the transmission of power to pulleys so located that the sliding of the carriage maintains the driving belt tension when the cross-cut shaft is in operation.

Another novel feature is the arrangement of pulleys and belt to operate simultaneously the rip-saw shaft and the jointer shaft.

Figure 1:
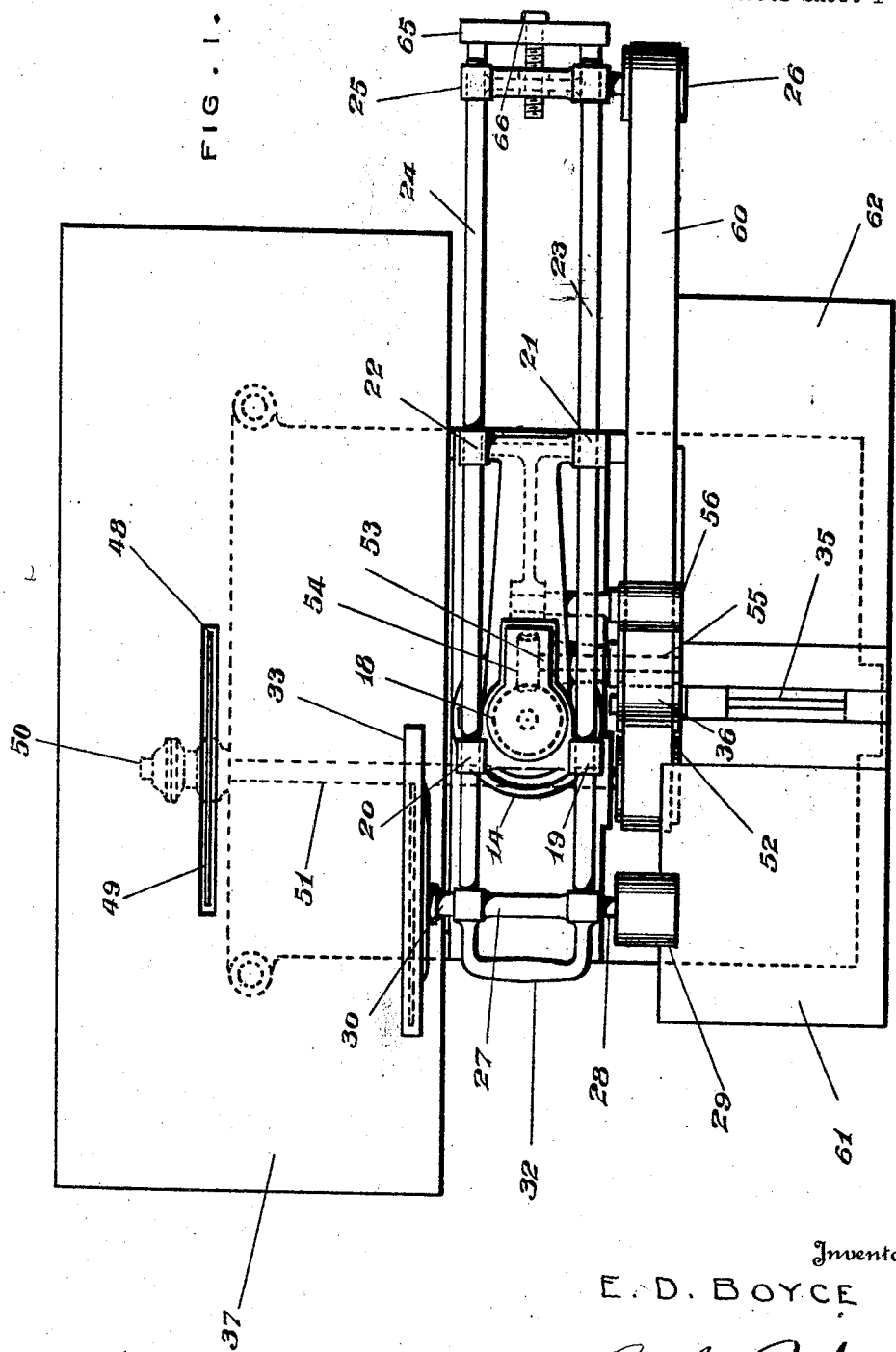
Figure 2:
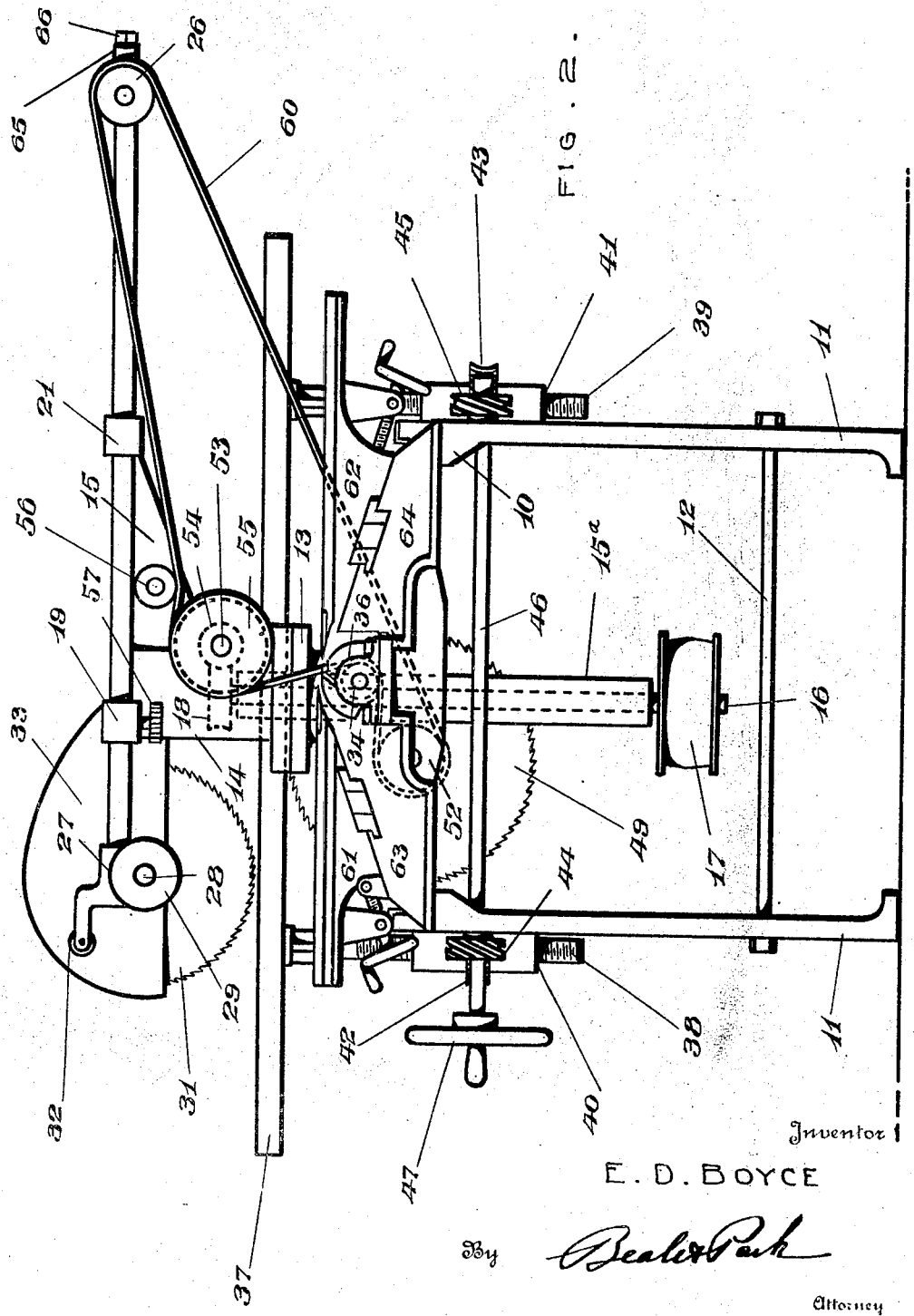

Referring to the drawings: Fig. 1 is a top plan view showing the driving belt trained to operate rip-saw and jointer shafts. Fig. 2 is a back view showing the driving belt similarly trained. Fig. 3 is a side view of my invention in which the cross-cut saw is shown in working position. Fig. 4 shows how a belt 60' may be trained to operate all three tools simultaneously.

Referring more particularly to the drawings my invention consists in a main frame 10, having legs 11, and tie rods 12, a base 13 mounted on said frame supporting a rotatable member 14 with an overhanging arm 15.

The base 13 and the rotatable member 14 have bored therein vertical holes for the reception of a hollow tube 15ª which is integral with the said base and which acts as a pintle for rotatable member 14. In this tube 15ª is journaled a shaft 16 at the lower end of which is mounted a pulley 17 and at the top end of which is mounted a spiral gear 18.

The rotatable member 14 is provided with two oppositely disposed laterally extending bushings 19 and 20 and the overhanging arm 15 is provided with two corresponding bushings 21 and 22.

Two parallel rods 23 and 24 are slidably mounted in said bushings. These rods are held together at one end by bracket 65. A sliding bracket 25 carries an idler pulley 26 and a screw 66 is interposed between the brackets for the purpose of adjusting the position of the idler pulley 26. To the other extremities of these rods is rigidly secured a cross-head 27 carrying a shaft 28 on one end of which is mounted a pulley 29 while the reverse end is a mandrel 30 on which is shown a cross-cut saw 31. A handle 32 is attached to the cross-head 27 for pulling the cross-cut saw through the work. A guard or hood 33 covers the upper edge of the circular saw 31.

On the base frame is suitably journalled a shaft 34 to which is attached a jointerhead 35 and on the far end of the shaft is mounted a pulley 36.

On the main frame is also mounted a movable table 37 supported by two screws 38 and 39 which pass respectively through vertical openings 40 and 41 formed in said main frame.

Upon said screws are screwed spiral gears 42 and 43 with internally threaded hubs. These gears mesh with spiral gears 44 and 45 mounted upon a shaft 46 which is operated by hand wheel 47.

A slot 48 is cut in the top of said table 37 to allow a circular tool as for example the rip-saw 49 to extend above the table top when said table is lowered.

The said saw 49 is mounted upon a mandrel 50 carried by a shaft 51 which is mounted in the main frame and driven by a pulley 52 mounted thereon and positioned in the same plane as the said jointer pulley 36.

In the rotatable member 14 is journalled a shaft 53 carrying a gear 54 adapted to mesh with gear 18, the outer end of said shaft having a pulley 55. An idler pulley 56 is also mounted on said member 14 and in a common vertical plane with said pulley 55 and said pulleys 29 and 26.

For purposes of adjustment a hand adjusting screw 57 is positioned to hold the slidable rod 23 in position. Also a bolt 58 is positioned in a slot 59 for the purpose of locking the rotatable member 14 in a fixed position relative to base 13.

The belt 60 is trained about the necessary pulley to operate the shafts mounted in the main frame in one position of adjustment and in another adapted to enter into driving connection with the tool shaft mounted on the sliding carriage. It is apparent that by lengthening the belt 60 it can be trained to operate both the shafts mounted in the main frame and the shaft mounted on the carriage. In this last position it would be necessary to add another work table mounted so as to hold work beneath the tool shaft mounted on the carriage. The above description is illustrated in Fig. 4. The lengthened belt is denoted by 60'. The auxiliary work table is denoted by 37'.

The adjustable members of the planer table are denoted by 61, 62, 63 and 64.

It will be noted that the idler pulley 56 is so positioned in reference to driving pulley 55 that the belt 60 will have sufficient traction in any of the three arrangements.

Claims:

1. A woodworking machine comprising a main frame, a turn-table rotatably mounted thereon, a reciprocating carriage mounted on the turn-table, a tool shaft upon said carriage, two tool shafts mounted in the main frame, each of said tool shafts having a pulley, a vertically disposed drive shaft having a gear, a shaft mounted in the turn-table having a pulley and a gear adapted to mesh with said first gear, an idler pulley on said turn-table a second idler pulley on said carriage, and a power transmission member adapted when in one position to connect the pulleys on the turn-table with the pulleys on the carriage and adapted when in another to enter into driving engagement with the pulleys on the turn-table, the idler pulley on the carriage and the pulleys on the two tool shafts upon the main frame.

2. In a woodworking machine the combination of a main frame, a turn-table rotatably mounted thereon, a carriage slidably mounted on the turn-table a driven shaft having a pulley mounted in the main frame, a counter shaft in the turn-table having a pulley thereon, driving means connecting said shafts, a tool shaft mounted on the carriage having a pulley, two tool shafts mounted in the main frame having pulleys, an idler pulley mounted on the turn-table, a second idler pulley mounted on the carriage, and a power transmission member connecting the counter shaft pulley, idler pulleys and all of said tool shaft pulleys.

3. In a woodworking machine the combination of a main frame, a turn-table rotatably mounted thereon, a carriage slidably mounted on the turn-table, a driven shaft having a pulley mounted in the main frame, a counter shaft in the turn-table having a pulley thereon, driving means connecting said shafts, two tool shafts mounted in the main frame having pulleys, an idler pulley mounted on the turn-table, a second idler pulley mounted on the carriage, and a power transmission member connecting the counter shaft pulley, idler pulleys and one or more interchangeably of the pulleys on the tool shafts mounted in the main frame.

4. In a woodworking machine the combination of a main frame, a turn-table rotatably mounted thereon, a carriage slidably mounted on the turn-table, a driven shaft having a pulley mounted in the main frame, a counter shaft in the turn-table having a pulley thereon, driving means connecting said shafts, a tool shaft mounted on the carriage having a pulley, an idler pulley mounted on the turn-table, a second idler pulley mounted on the carriage, and a power transmission member connecting the counter shaft pulley, idler pulleys and the pulley on said tool shaft.

5. In a woodworking machine the combination of a main frame, a turn-table rotatably mounted thereon, a carriage slidably mounted on the turn-table, a driven shaft having a pulley mounted in the main frame, a counter shaft in the turn-table having a pulley thereon, driving means connecting said shafts, a tool shaft mounted on the carriage having a pulley, two tool shafts mounted in the main frame having pulleys, an idler pulley mounted on the turn-table, a second idler pulley mounted on the carriage, a power transmission member connecting the pulley on said counter shaft, said idler pulleys and the pulleys on the tool shafts mounted in the main frame in one position of adjustment and in another with the pulley on the tool shafts mounted on said carriage.

In testimony that I claim the foregoing as my own, I affix my signature.

EDWIN DOUGLAS BOYCE.